United States Patent [19]
Bayer, Jr. et al.

[11] 3,733,467
[45] May 15, 1973

[54] PERFORATED TAPE READER

[75] Inventors: Carl Bayer, Jr., Hackensack; Robert Kelly, Old Tappan, both of N.J.

[73] Assignee: Data Peripheral Inc., Hackensack, N.J.

[22] Filed: Sept. 13, 1971

[21] Appl. No.: 179,879

[52] U.S. Cl. ........235/61.11 C, 340/174.1 A, 200/46
[51] Int. Cl. ........G06k 7/04
[58] Field of Search ........200/46; 178/17 B, 178/17 A, 42; 235/61.11 C; 340/174.1 A

[56] References Cited

UNITED STATES PATENTS

| | | | |
|---|---|---|---|
| 3,496,342 | 2/1970 | Milford | 235/61.11 E |
| 3,275,208 | 9/1966 | Poumakis | 178/42 X |
| 3,576,584 | 4/1971 | Cone et al. | 340/174.1 A |
| 3,188,450 | 6/1965 | Wagemann | 235/61.11 C |
| 3,116,409 | 12/1963 | Lohr et al. | 235/61.11 C |
| 3,350,546 | 10/1967 | Marjoram et al. | 235/61.11 C |

*Primary Examiner*—Daryl W. Cook
*Assistant Examiner*—Joseph M. Thesz, Jr.
*Attorney*—Alex Friedman et al.

[57] ABSTRACT

A perforated tape reader having a rotatable capstan engaging the tape for advancing same. Perforation in said tape are detected along an axis substantially transverse thereto by an array of pivotally mounted star wheels and a data signal is produced in response to such detection. A plurality of apertures are circumferentially spaced in the surface of said capstan out of registration with said tape, and a timing signal is produced in response to the detection of said apertures by a further pivotally mounted star wheel.

10 Claims, 7 Drawing Figures

INVENTOR.
CARL BAYER, Jr.
ROBERT KELLY
BY
Blum, Moscovitz, Friedman & Kaplan
ATTORNEYS INVENTOR.
CARL BAYER, Jr.
ROBERT KELLY
BY
Blum, Moscovitz, Friedman & Kaplan
ATTORNEYS INVENTOR.
CARL BAYER, Jr.
ROBERT KELLY
BY
Blum, Moscovitz, Friedman & Kaplan
ATTORNEYS

PERFORATED TAPE READER

BACKGROUND OF THE INVENTION

This invention relates generally to devices for reading perforated tapes wherein data is recorded in a plurality of axially extending channels on said tape by the presence or absence of perforations. Each word of data may be represented by one or more transversely extending lines encompassing each of said axially extending channels. One important problem in the reading of such paper tapes is the proper identification of the data in each of said transverse lines. Due do skewing of the tape or other deformations thereof during high speed readings, it is difficult to identify the particular data bit associated with each transverse line. It is readily apparent that accurate data reading requires that only the bits in a particular line be detected, the detection of earlier or later bits in any channel resulting in the reading of erroneous data.

By providing an accurate timing signal generating device for controlling when data is read, the foregoing difficulties are avoided. Further, by providing a quick adjusting means to insure proper alignment of the data reading means of the device according to the invention, accurate reading can be readily assured.

SUMMARY OF THE INVENTION

Generally speaking, in accordance with the invention, a perforated tape reader is provided having a rotatable capstan engaging said tape for advancing same, means for detecting perforations in said tape along an axis substantially transverse to said tape, and data signal means operable in response to said perforation detecting means. A plurality of apertures are circumferentially spaced in the capstan out of registration with said tape and means are provided for detecting said apertures in said capstan. Timing signal means are provided operable in response to said perforations.

Said aperture detecting means preferably includes a pivotably mounted lever arm and a star wheel mounted on said lever arm for riding in and out of said apertures for sequentially pivoting said lever arm, means being provided for biasing said star wheel against said capstan. Said timing signal means includes a switch means operable in response to the pivotable displacement of said lever.

The axis along with said tape perforation detecting means effects detection may be in alignment with said aperture detecting means star wheel. Said perforation detecting means may include a plurality of pivotably mounted lever arms, a star wheel mounted on each of said lever arms. A circumferential groove is formed in the surface of said capstan in registration with each of the data channels on said tape, each of said lever arms being positioned in registration with one of said channels, the respective star wheels being biased toward said capstan and being in substantial transverse alignment. Said data signal means may include a switch means operative in response to the pivotable displacement of each of said data lever arms.

Said tape reader may include a frame, a shaft for pivotably mounting said lever arms, and eccentric means for mounting said shaft on said frame for selectively aligning the axis of said shaft in substantially parallel relation to the axis of said capstan.

Accordingly, it is an object of this invention to provide a perforated tape reader in which periodic timing signals are produced coordinate with the passing of the tape past the reader for coordinate reading of a line of data.

Another object of the invention is to provide means for quickly aligning the reading means to insure reading of a particular line, permitting flexibility in manufacturing tolerances.

Still other objects and advantages of the invention will in part be obvious and will in part be apparent from the specification and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 2:
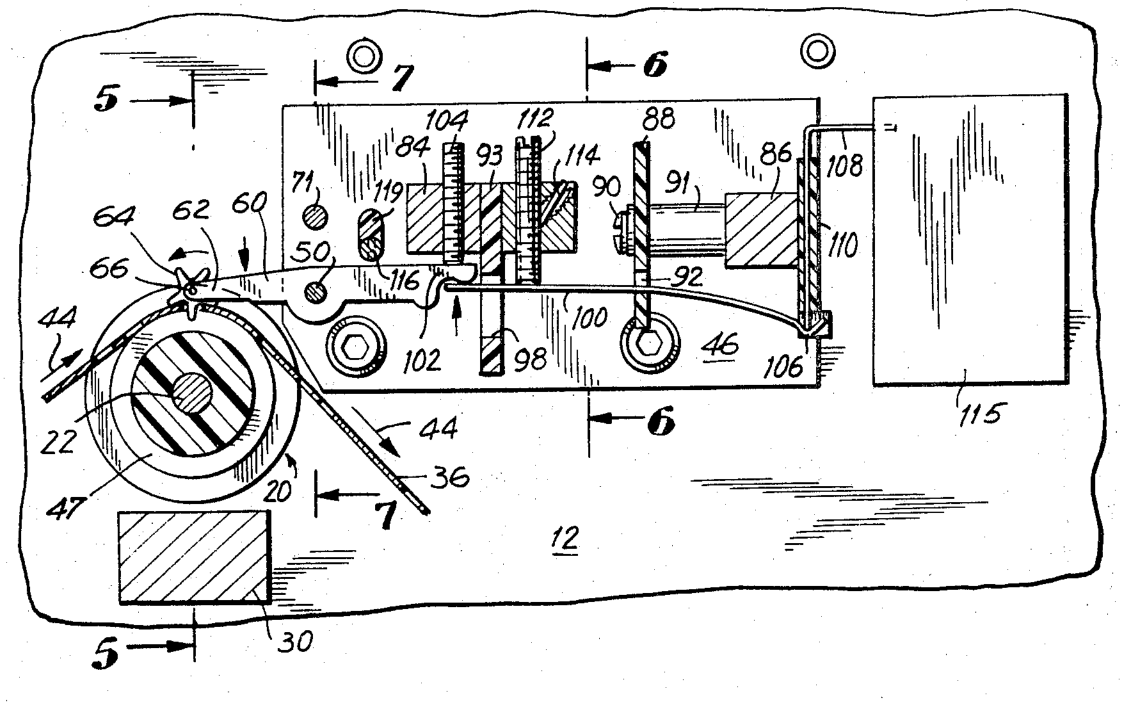
FIG. 2 is a sectional taken along lines 2 — 2, showing the device when a perforation is detected in the tape.
Figure 5:
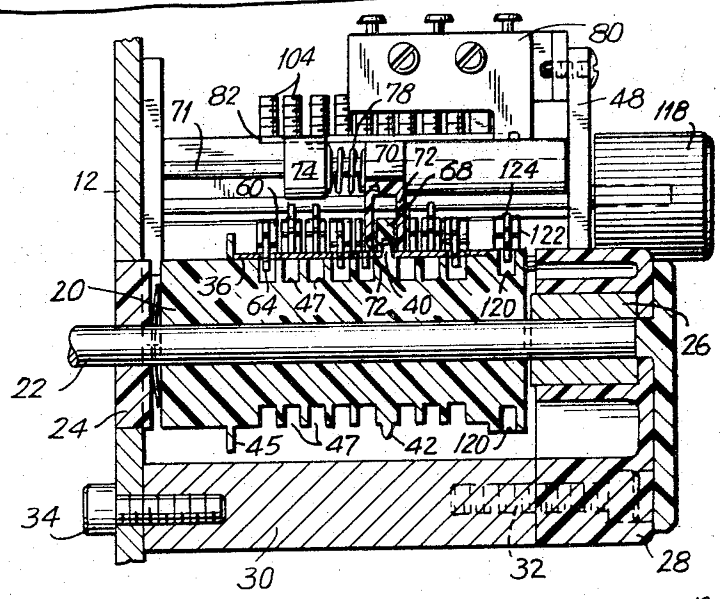
FIGS. 5, 6 and 7 are sectional views taken along lines 5 — 5, 6 — 6, and 7 — 7 respectively on FIG. 2.
Figure 6:
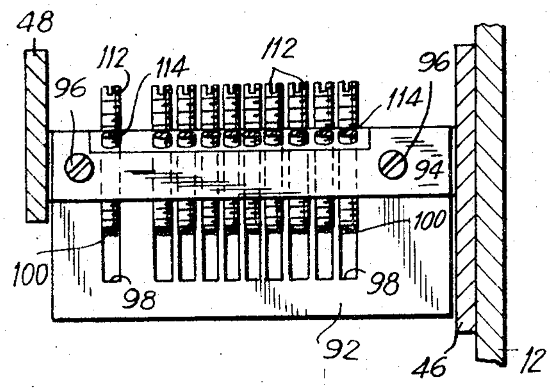

Referring now to FIG. 2, the perforated tape reader 10 according to the invention consists of a mounting plate 12 having a drive motor 14 operatively coupled to a drive transmission 16 mounted on one side of said plate and a reader mechanism 18 mounted on the other side thereof. Drive transmission 16 is operatively coupled to a capstan 20 through a drive shaft 22 as best shown in FIG. 5. Said drive shaft is journaled through plate 12 in a bearing 24. The outer end of shaft 22 is supported in bearing 26, which in turn is carried on end cover 28, said end cover being secured to a bean 30 by bolts 32. Said beam is in turn mounted on plate 12 by bolt 34.

As best shown in FIG. 2, the tape 36 is provided with eight data channels, by way of example, said channels extending along parallel tracks on said tape. Data is indicated in the tape by the presence or absence of a perforation at each predetermined location in each channel. Each data word would consist of one or more transversely extending lines of data bits, each data bit consisting of a perforation or lack of perforation at one of the channels. Thus, the perforations 38 define a single line, said line being represented by a perforation in the channel closest to plate 12, no perforation in the next channel, a perforation in the third channel, no perforation in each of the fourth, fifth and sixth channels, a perforation in the seventh channel, and no perforation in the eighth channel. The tape is also provided with a longitudinally extending series of sprocket holes 40.

As shown in FIGS. 2 – 5, the tape 36 passes around capstan 20. Said capstan is formed with a circumferential set of projecting teeth 42 dimensioned for receipt within sprocket holes 40, as shown in FIG. 5. Thus, tape 36 is advanced in the direction of arrows 44 in response to the rotation of capstan 20 due to the interaction of teeth 42 and sprocket holes 40.

Figure 7:
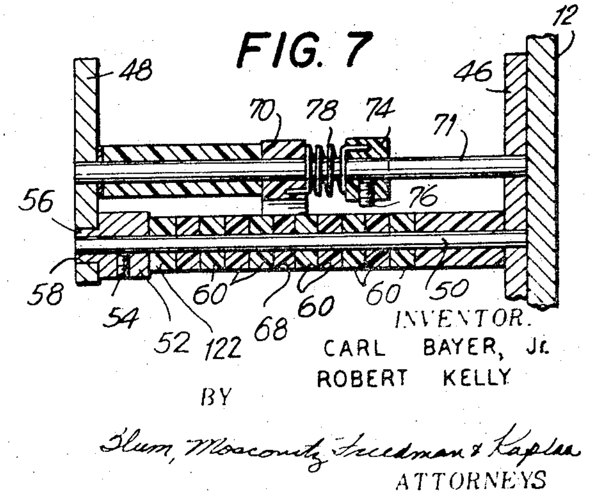

As best shown in FIG. 5, capstan 20 is provided with a radial flange 46 which serves as a guide for the edge of tape 36. Further, said capstan is formed with eight annular grooves 48 in the surface thereof positioned for alignment with the eight data channels in tape 36, when said tape is engaged with teeth 40. The remaining portion of reader mechanism 18 is mounted between a pair of support plates 46 and 48, support plate 46 being mounted on plate 12. As best shown in FIG. 7, a shaft 50 is mounted on said plate, one end of said shaft being mounted directly in an aperture in plate 46, the other end of said shaft being secured in an eccentric member 52 by means of a set screw 54, said eccentric member having a portion 56 eccentric relative to the axis of shaft 50. Eccentric portion 56 is received within a round aperture 58 in support plate 48. It is intended that the respective longitudinal axes of shaft 50 and capstan 20 be substantially parallel, and this parallel relation is readily achieved by the adjusting of eccentric member 52. Eight reading levers 60 are pivotably mounted on shaft 50. The end 62 of each of levers 60 is forked to define a recess for receiving a star wheel 64, which is mounted on each of said reading levers by means of an axle 66. Said reading levers are dimensioned so that the star wheels are substantially aligned on an axis substantially parallel to the axis of capstan 20, with each of said star wheels in alignment with one of the channels 48.

A holddown lever 68 is also pivotably mounted on shaft 50. The lower edge of the end of said holddown lever adjacent capstan 20 is slotted to accommodate teeth 42, so that the lower edge of said holddown lever engages the tape 36 against the surface of capstan 20. A further holddown lever 70 is positioned above holddown lever 68 and is pivotably mounted on a shaft 71, which is in turn mounted on support plates 46 and 48. The end of further holddown lever 70 is provided with a pair of depending fingers 72 which extend on either side of holddown lever 68, said fingers being aligned with the channels 48 on either side of teeth 40. When tape 36 is in position, said fingers rest on said tape.

Figure 3:
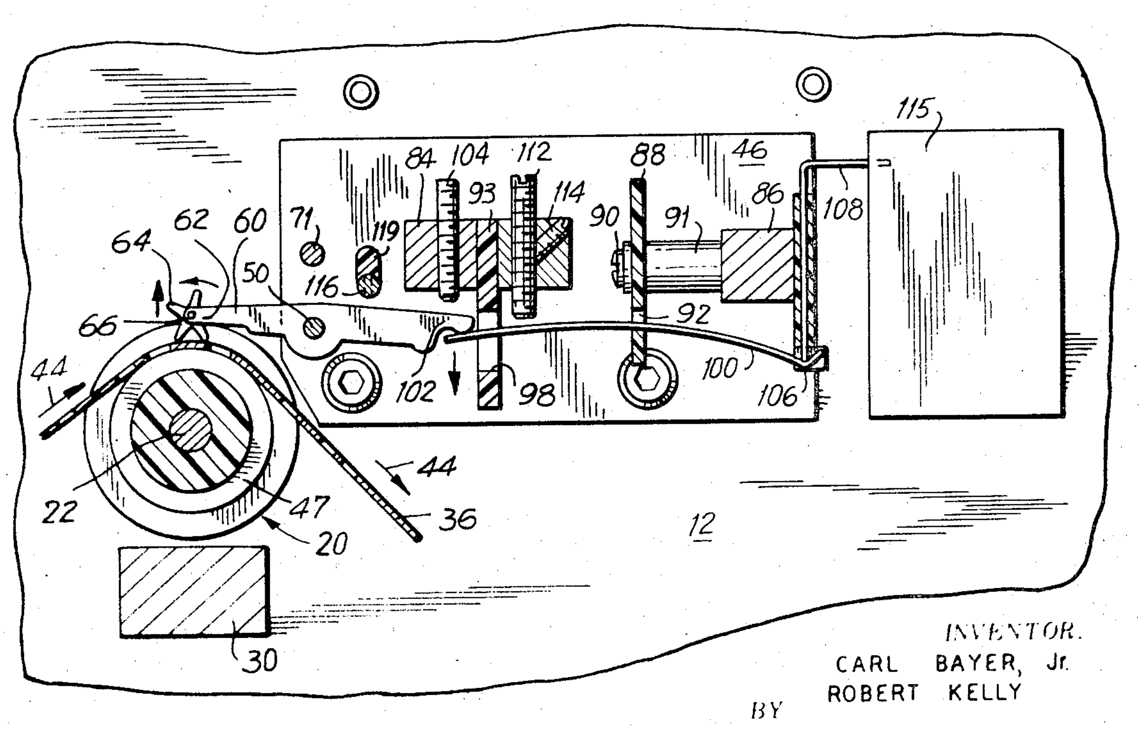
FIG. 3 is a view corresponding to FIG. 2 showing the device when no perforation is present in the tape.
Figure 4:
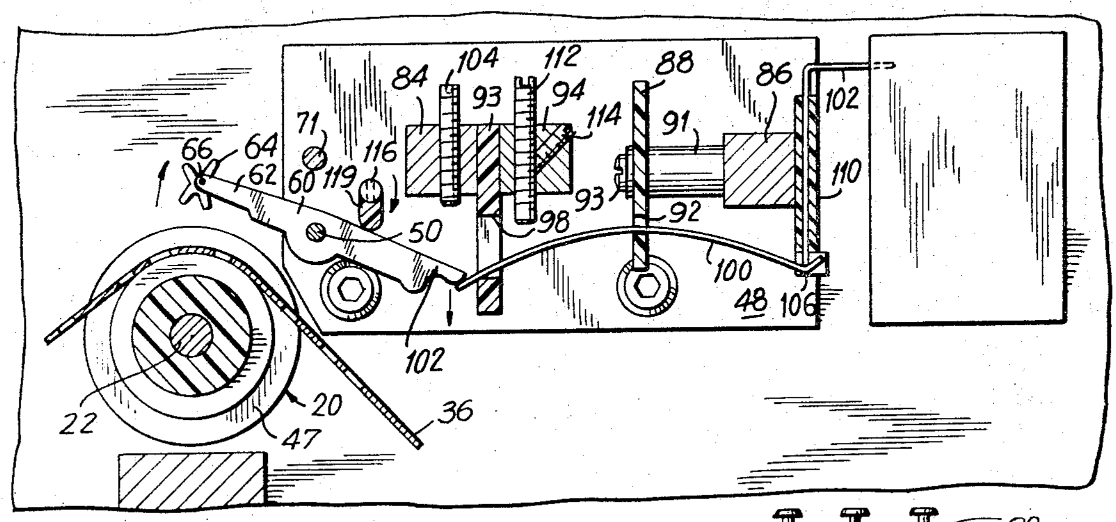
FIG. 4 is a view corresponding to FIG. 2 showing the device disposed in a non-reading mode.

A spring support member 74 is also mounted on shaft 71 and is fixed thereto by a set screw 76. A coil spring 78 is fixed between said spring support and said further holddown lever to bias fingers 72 thereof toward capstan 20. A micro-switch 80 is mounted above further holddown lever 70 on plate 48. Micro-switch 80 is operated by a leaf switch member 82 which is engaged by the end of further holddown lever 70 spaced from capstan 20. Micro-switch 80 provides an indication of the presence of a tape in the paper tape reader, since the position of further holddown lever 70, and therefore leaf switch member 82 is dependent on the presence or absence of a tape in the device. Support plates 46 and 48 are maintained in spaced relation by a pair of beams 84 and 86. A contact support plate 88 is mounted on beam 86 by means of bolts 90 and spacer 91. Contact support plate 88 is formed with a plurality of aligned spaced apertures 92 therethrough. A contact guide plate 93 and a contact block 94 are mounted on beam 84 by means of bolts 96. Contact guide plate 93 is provided with a plurality of parallel spaced vertically extending slots 98 therethrough as best shown in FIGS. 2 – 4. A spring contact 100 extends through each of the apertures 90 in contact support plate 88, and the slots 98 in contact guide plate 93 and engages the end 102 of each of reading levers 60 to bias said reading lever against a positioning screw 104 aligned therewith. End 106 of each spring contact 102 is engaged against an L-shaped contact 108 mounted in a contact plate 110, which contact plate is secured to beam 86.

An adjustable contact screw 112 associated with each of spring contacts 100 extend through contact block 94 and is positioned for engagement with the associated contact spring under predetermined circumstances more particularly described below. A set screw 114 is provided in contact block 94 for locking each of the contact screws 112 in position.

Referring now to FIGS. 2 and 3, it is apparent that the components are adjusted so that when an arm of the star wheel 64 mounted on the end of one of reading levers 60 passes through a perforation in tape 36, then said reading lever is biased in its extreme counterclockwise position by spring contact 100. At this position, said spring contact is connected to contact screw 112 to close an electrical connection between contact block 94, and L-shaped contact 108. Said L-shaped contact would be connected to reading circuitry shown schematically by block 115.

When, as more particularly shown in FIG. 3, no perforation appears on the tape, the star wheel rides on the surface of tape 36 to pivot the reading lever in a clockwise direction which serves to disconnect spring contact 100 from screw contact 112, thereby opening the above-described circuit. Reading circuitry 115 detects the opening and closing of each of the switches defined by each spring contact 100 and screw contact 112 to determine the state of the data in each channel.

In order to permit the advancing of the tape without reading, a shaft 116 is mounted between plates 46 and 48 for rotation by a knob 118 which projects outside of plate 48, as shown in FIG. 5. A blade 119 is mounted on shaft 116, said blade being dimensioned to engage against all of the reading levers 60, as more particularly shown in FIG. 4, to pivot said reading levers in the extreme counter clockwise direction. When so positioned, star wheels 64 are out of engagement with the tape 36, and the contact between each of the spring contacts 100 and its respective screw contact 112 is broken. The slots 98 are dimensioned to permit the displacement of the end of spring contact 100 as shown in FIG. 4.

The reading lever 60 associated with each data channel operates independently to selectively open and close its associated switch to provide an indication of the presence or absence of a perforation at each predetermined location on the channel. Holddown lever 68 is also biased by a spring contact 100, and an associated screw contact 112 may be provided to provide an indication that blade 119 has been positioned as shown in FIG. 4 and that the device is in a non-read mode. Contact block 94 serves as a common terminal for all of the channels, and the absence or presence of a signal at each of the L-shaped contacts 108, as detected by reading circuitry 115, provides an indication of the presence or absence of a perforation. Each of the eight data channels should be coordinately read by reading circuitry 115 at periodic instants which are most likely to represent an accurate line of data, taking into consideration the possibility of skewing and other defects.

Figure 1:
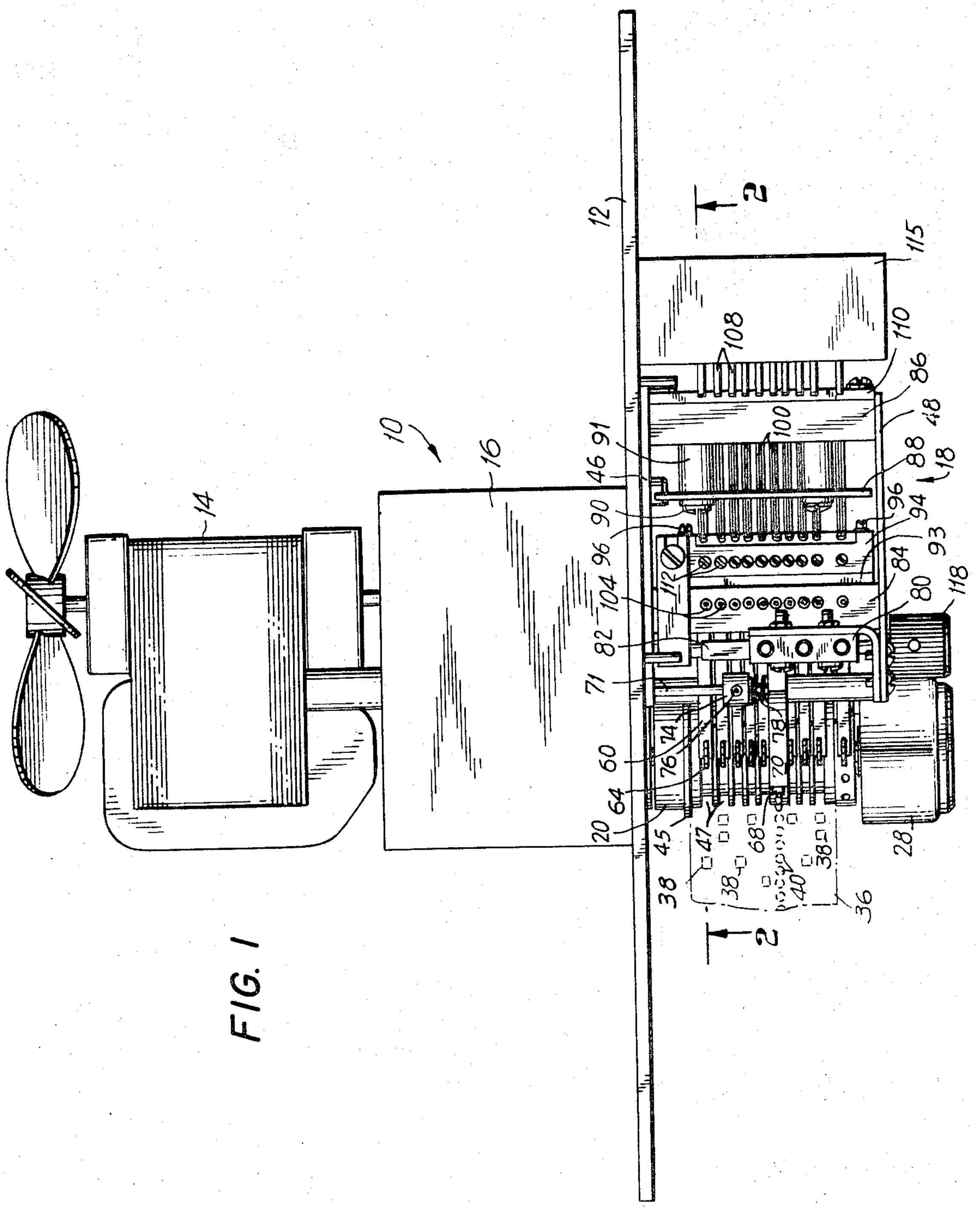
FIG. 1 is a top plan view of the perforated tape reader according to the invention.

In order to generate timing signals for this purpose, capstan 20 is provided with a plurality of circumferentially spaced apertures 120, as best shown in FIGS. 1 and 5. A timing lever 122 is pivotably mounted on shaft 50 and coupled with a contact spring 100, screw contact 112, and L-shaped contact 108, in the manner described above in connection with reading levers 68. Further, a star wheel 124 is mounted on the end of said timing lever in registration with apertures 120. Thus, timing lever 122 and star wheel 124 and the mechanism associated therewith are similar in construction to, and function in the same manner as reading levers 60, star wheels 64 and the mechanisms associated therewith. However, instead of being responsive to perforations or the lack thereof in tapes 36, timing lever 122 serves to periodically open and close a switch responsive to the presence or absence of one of apertures 120. The circumferential space between apertures 120 is preferably twice the minimum spacing between data bits on each channel on tape 36 so that reading circuitry 115 detects an alternating square wave output at the L-shaped contact corresponding to the displacement of timing lever 122, each positive or negative pulse of said timing signal being representative of one data bit on the channels of tape 36. In one embodiment of the arrangement according to the invention, the pitch of the star wheels 64 and 124 is equal to the spacing between the centers of adjacent sprocket holes 40 in tape 36, while the spacing between the centers of apertures 120 equals twice the spacing between the centers of said sprocket holes.

By effecting reading of each of the channels of the tape at a predetermined delay after the leading edge of each pulse of the timing signal, accurate reading of tape 36 is assured.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a perforated tape reader having a rotatable capstan engaging said tape for advancing same, means for detecting perforations in said tape along an axis substantially transverse of said tape, and data signal means operable in response to said perforation detecting means, the improvement which comprises a plurality of apertures circumferentially spaced in the surface of said capstan out of registration with said tape; means for detecting said apertures in said capstan, said aperture detecting means including a pivotably mounted timing lever; a star wheel freely rotatably mounted on said timing lever; and means for biasing said timing lever so that said star wheel engages said capstan, said timing lever being positioned so that said star wheel is aligned with said capstan apertures so that said timing lever is pivoted in response to said star wheel riding in and out of said apertures during the rotation of said capstan; and timing signal means operable in response to said perforations for generating a timing signal.

2. A perforated tape reader as recited in claim 1, wherein said timing signal means includes switch means coupled to said timing lever for opening and closing in response to the pivoting of said timing lever.

3. A perforated tape reader as recited in claim 2, wherein the circumferential spacing of said capstan aperture is such that at least one opening or closing of said switch means corresponds to each data bit in a channel on said tape.

4. A perforated tape reader as recited in claim 2, wherein said timing signal means includes a spring contact operatively coupled to said timing lever for displacement in response to the pivoting thereof and for biasing said star wheel against said capstan, and a fixed contact in the path of the displacement of said spring contact.

5. A perforated tape reader as recited in claim 1, wherein said tape perforation detecting means includes a fixed shaft; a plurality of reading levers pivotably mounted on said shaft, one of said reading levers corresponding to each channel on said tape; a star wheel mounted on each of said reading levers; a plurality of circumferential groove in the surface of said capstan, one of said grooves being positioned in alignment with each of said data channels; and means for biasing each of said star wheels against said capstan in registration with one of said grooves so that each of said reading levers is pivotably positioned in response to the presence or absence of a perforation in the associated data channel, said data signal means including switch means operatively coupled to said reading levers and responsive to the pivotal position thereof.

6. A perforated tape reader as recited in claim 5, wherein said switch means includes a spring contact coupled to each of said reading levers for displacement in response thereto for biasing said reading levers to engage its star wheel against said capstan; and a fixed contact positioned in the path of each of said spring contacts.

7. A perforated tape reader as recited in claim 5, including a frame, eccentric means for mounting said shaft on said frame, said eccentric means being displaceable relative to said shaft for the selective positioning of said shaft in substantially parallel relation to the axis of said capstan.

8. A perforated tape reader comprising a frame; a capstan rotatably mounted on said frame, said capstan being formed with means for engaging said tape for advancing same, and with a plurality of peripheral grooves in the surface thereof, one of said grooves being aligned with each data channel on said tape; a shaft; eccentric means for mounting said shaft on said frame, said eccentric means being displaceable to selectively align said shaft in substantially parallel relation to said capstan; a plurality of reading levers pivotably mounted on said shaft, one of said reading levers being associated with each of said data channels on said tape; a star wheel mounted on each of said reading levers and positioned in registration with one of said capstan grooves; means for biasing each of said star wheels against its associated groove so that said reading lever is pivoted in response to the projection of said star wheel into and out of the associated peripheral groove in the capstan in response to the presence or absence of a perforation in the associated channel of said tape; and switch means coupled to each of said reading levers for producing a data signal in response to the pivoting thereof.

9. A perforated tape reader as recited in claim 8, wherein said capstan is provided with a plurality of apertures circumferentially spaced in the surface thereof out of registration with said tape; means for detecting said apertures in said capstan; and timing signal means operable in response to said aperture detecting means.

10. A perforated tape reader as recited in claim 9, wherein said aperture detecting means includes a timing lever pivotably mounted on said shaft; a star wheel mounted on said timing lever and positioned for registration with said capstan apertures; and means for biasing said star wheel against said capstan or pivoting said timing lever as said star wheel rides in and out of said capstan apertures.

* * * * *